May 1, 1923.  
F. J. CHAMPLIN  
1,453,491

VOLTAGE REGULATING SYSTEM

Filed March 22, 1921

Inventor:
Franklin J. Champlin,
by Albert G. Davis
His Attorney.

Patented May 1, 1923.

1,453,491

UNITED STATES PATENT OFFICE.

FRANKLIN J. CHAMPLIN, OF PITTSFIELD, MASSACHUSETTS, ASSIGNOR TO GENERAL ELECTRIC COMPANY, A CORPORATION OF NEW YORK.

VOLTAGE-REGULATING SYSTEM.

Application filed March 22, 1921. Serial No. 454,447.

*To all whom it may concern:*

Be it known that I, FRANKLIN J. CHAMPLIN, a citizen of the United States, residing at Pittsfield, in the county of Berkshire, State of Massachusetts, have invented certain new and useful Improvements in Voltage-Regulating Systems, of which the following is a specification.

My invention relates to voltage regulating systems for alternating current circuits employing induction regulators and is especially applicable to voltage regulating systems for high voltage alternating current circuits.

It is well known that it is impracticable to design induction regulators for direct installation on high voltage circuits because of the greatly increased cost, and, it has been the practice heretofore to use exciting and series transformers with the induction regulators when used for this purpose. These auxiliary transformers, however, increase the cost of the regulating equipment materially as they have to be of the same capacity as the regulator.

An object of my invention is to provide a method of operation, and means for carrying out the method, whereby the desired regulation in a regulating system in which an induction regulator with a series transformer is used, may be obtained with an induction regulator of very much smaller capacity than is possible with any arrangement used heretofore. Consequently the cost of a regulating system embodying my invention is much less than any of the systems used heretofore.

In accordance with my invention, I connect the windings of the induction regulator together as an autotransformer and provide the necessary number of turns in both windings, so that when the regulator is in a predetermined bucking position, preferably its maximum bucking position, the voltage across the secondary terminals of the regulator is zero. To the secondary terminals of the regulator, I connect the primary winding of a series transformer, the secondary winding of which is connected in series with the circuit to be regulated. Suitable switching means is provided between the secondary terminals of the regulator and the primary winding of the series transformer, whereby the connections of the primary windings may be reversed. Suitable switching means may also be provided for short circuiting the primary winding of the series transformer.

My invention will be better understood from the following description taken in connection with the accompanying drawing, and its scope will be pointed out in the appended claims.

Figure 1:
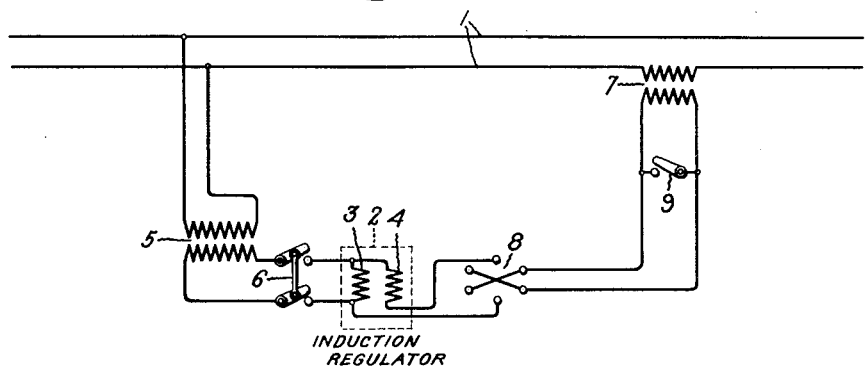
Figure 2:
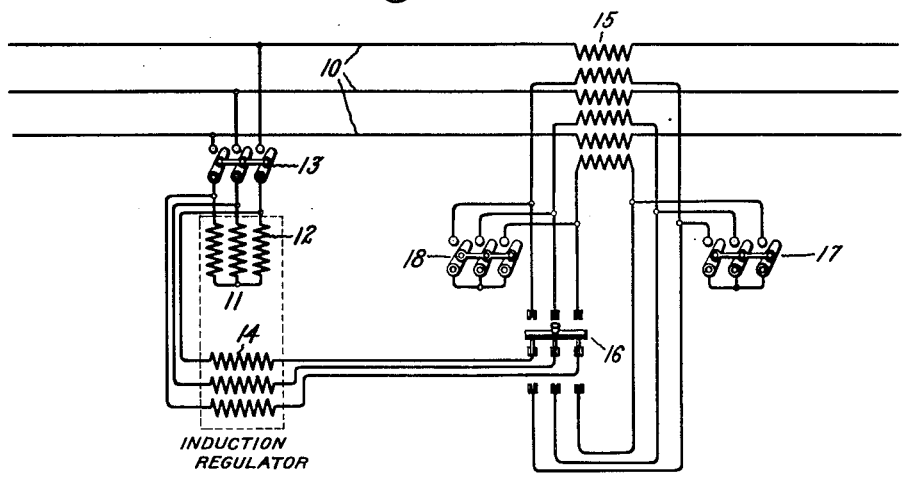

Referring to the accompanying drawing, Figure 1 is a diagrammatic view showing the apparatus and connections which may be used in a regulating system embodying my invention in which a single phase regulator is employed; and Fig. 2 is a modification of the arrangement shown in Fig. 1 showing the apparatus and connections which may be used when a three-phase regulator is used.

Refering to Fig. 1, 1 represents a single phase alternating current circuit whose voltage is to be regulated. The regulating equipment shown for controlling the voltage of the alternating current circuit comprises an induction regulator 2 having an inducing or primary winding 3 and an induced winding 4, one of which is adapted to be moved relative to the other, so that the voltage induced in the winding 4 may be varied. The windings 3 and 4 are connected together as an auto-transformer. In the arrangement shown, substantially the same number of turns are provided in both of the windings 3 and 4 so that when the regulator is in its maximum boosting position the voltage across the secondary terminals is equal to twice the voltage impressed across the primary winding 3, and when the regulator is in its maximum bucking position the voltage across the secondary terminals of the regulator is zero. While I prefer to use a regulator having the proper number of turns in both of its windings so that the voltage across its secondary terminals is zero when it is in its maximum bucking position, as with this arrangement the cost and size of the regulator is a minimum it is to be understood that my invention is not limited to this particular arrangement as it will be evident that any single-phase regulator may be used, which is designed so that the voltage across its induced winding is equal to the voltage impressed across its primary winding when the regulator is in a predetermined bucking position. The primary winding 3 of the regulator is connected across the alternating current circuit 1 by means of the transformer 5 and the switch 6 which may be of any suitable type. The secondary terminals of the regulator are connected to the primary winding of a series transformer 7 by means of a reversing switch 8 of any suitable type. The secondary winding of the series transformer 7 is connected in series with the alternating current circuit 1. A switch 9 is provided for short circuiting the primary winding of the series transformer 7.

The cycle of operation of the regulating system shown in Fig. 1 is as follows:— With the switch 9 open and the regulator 2 in its maximum boosting position and the switch 8 closed so that the voltage impressed across the primary winding of the series transformer 7 produces a voltage in the secondary winding which boosts the voltage of the alternating current circuit 1, the maximum boosting effect of the regulating system is produced. The voltage impressed upon the primary winding of the series transformer 7 at this time is equal to twice the voltage impressed upon the primary winding 3 of the induction regulator. To lower the boosting effect of the regulating equipment, the induction regulator 2 is turned towards its maximum bucking position by any well known means which may be controlled either manually or automatically. As the regulator rotates towards its neutral position, the voltage induced in the winding 4 gradually decreases to zero so that when the regulator reaches its neutral position the voltage impressed upon the primary winding of the series transformer 7 is equal to the voltage impressed across the terminals of the primary winding 3 of the induction regulator. As the induction regulator is rotated from its neutral position towards its maximum bucking position the voltage induced in the winding 4 opposes the voltage impressed across the winding 3. Consequently, the voltage impressed in the primary winding of the series transformer 7 is gradually decreased until the regulator reaches a predetermined bucking position, which in the arrangement shown is its maximum bucking position, at which time the voltage induced in the winding 4 is equal and opposite to the voltage impressed upon the primary winding 3. Therefore, the voltage across the primary winding of the series transformer is zero, and the line voltage is neither raised nor lowered. To further reduce the voltage of the alternating current circuit 1 the connections of the primary winding 7 are reversed by means of the reversing switch 8 and the induction regulator is then rotated from this predetermined bucking position towards its maximum boosting position. Since the polarity of the series transformer 7 is now reversed it will be evident that an increase in the voltage applied to its primary winding will increase the bucking effect of the transformer. Consequently, the rotation of the induction regulator towards its maximum boosting position gradually decreases the voltage on the alternating current circuit until the regulator reaches its maximum boosting position at which time the maximum bucking effect of the regulating equipment is obtained.

In order to protect the series transformer from being damaged when the reversing switch 8 is operated to reverse the connections of the primary winding I provide the switch 9 for short circuiting this primary winding. This switch 9 is closed just before the reversing switch 8 is operated at which time the voltage across the primary winding of the series transformer is zero and is opened as soon as the reversing switch has been operated to change the connections of the primary winding. Any suitable interlocking arrangement may be used, if desired, for preventing the operation of the switch 9 while the switch 8 is open. While I have shown the reversing switch 8 and the short circuiting switch 9 as being arranged to be operated manually, these switches may be motor-operated or automatically operated by the regulator in any well known manner. Furthermore, it is evident that the exciting transformer 5 is not necessary except in such cases where the voltage of the circuit being regulated is too high for the induction regulator.

By using the apparatus and the method of operation above described it will be evident that the size of the regulator is reduced to one-half the size of that which would be required to give the same range of regulation where the induced winding is connected directly in series with the circuit being regulated as is the general practice, or connected directly to the primary winding of a series transformer, the secondary winding of which is connected in the circuit being regulated.

In Fig. 2 I have shown a regulating system for a three-phase alternating current circuit embodying my invention in which a three-phase induction regulator is employed. In this figure 10 represents a three-phase alternating current circuit, the voltage of which is to be regulated. 11 represents a three-phase induction regulator having an inducing or primary winding 12 connected by means of a switch 13 to the three-phase circuit 10 and an induced winding 14. The windings 12 and 14 are connected together as an auto-transformer and are provided with the necessary number of windings so that when the regulator is in its maximum bucking position the voltages across the secondary terminals of the regulator will be zero. The secondary terminals of the regulator are adapted to be connected to opposite ends of the primary windings of the series transformer 15 by means of the reversing switch 16 of any suitable type. The reversing switch is shown as a three-pole, two-position manually controlled switch. Switches 17 and 18 of any suitable construction are provided for short circuiting opposite ends of the primary windings of the series transformers. The secondary windings of the series transformer 15 are connected in series with the different phases of the alternating current circuit 10.

The cycle of operation of the arrangement shown in this figure is substantially the same as the arrangement shown in Fig. 1 and therefore a detailed description thereof is deemed unnecessary. Let us assume that the switch 16 is in its upper position as shown in the drawing. The switch 17 is then closed thereby short circuiting the other side of the primary winding of the series transformer 15 and the switch 18 is open. During the reversing operation the switch 18 is closed first, then the switch 16 is moved from its upper to its lower position, and the switch 17 is opened. Otherwise, the operation is the same as for the single-phase regulator. With the arrangement shown in Fig. 2, it will be evident that the regulator may be cut in and out of the alternating current circuit by merely moving it to its maximum bucking position at which time the voltage across the secondary terminals of the regulator is zero and therefore the switches 17 and 18 may be closed and the switch 16 moved to its mid-position to disconnect the regulator from the series transformer. The switch 13 may then be opened thereby entirely removing the regulator from the alternating current circuit. It is therefore unnecessary to provide with this arrangement any other equipment to prevent the secondary windings of the transformer from being short circuited when the regulator is being removed from the circuit being regulated.

While I have shown and described two embodiments of my invention various modifications and changes may be made wherein without departing from the spirit and scope of my invention and I aim to cover in the appended claims all such modifications and changes.

What I claim as new and desire to secure by Letters Patent of the United States, is:—

1. In a voltage regulating system for an alternating current circuit, the combination of an induction regulator having its inducing and induced windings connected together as an auto-transformer and substantially the same number of turns in both windings, a series transformer having its primary winding connected to the terminals of said regulator and its secondary winding connected in series with the circuit to be regulated and switching means adapted to reverse the connections of the primary winding of said transformer to said regulator.

2. In a voltage regulating system for an alternating current circuit, the combination of an induction regulator having its inducing and induced windings connected together as an auto-transformer and substantially the same number of turns in both windings, a series transformer having its primary winding connected to the terminals of said regulator and its secondary winding connected in series with the circuit to be regulated, and switching means adapted to short circuit the primary winding of said series transformer and to reverse the connections thereof to said regulator.

3. In a voltage regulating system for an alternating current circuit, the combination of an induction regulator having its inducing and induced windings connected together as an auto-transformer and provided with the proper number of turns so that the voltage across the secondary winding of the regulator is zero when the regulator is in its maximum bucking position, a series transformer having its primary winding connected to the terminals of said regulator and its secondary windings connected in series with the circuit to be regulated, and switching means adapted to reverse the connections of the primary winding of said transformer to said regulator.

4. In a voltage regulating system for an alternating current circuit, the combination of an induction regulator having its inducing and induced windings connected together as an auto-transformer and provided with the proper number of turns so that the voltage across the secondary windings of the regulator is zero when the regulator is in its maximum bucking position, a series transformer having its primary winding connected to the terminals of said regulator and its secondary winding connected in series with the circuit to be regulated, and switching means adapted to short circuit the primary winding of said series transformer and to reverse the connections thereof to said regulator.

5. In a voltage regulating system for an alternating current circuit, the combination of an induction regulator having its inducing and induced windings connected together as an auto-transformer and provided with the proper number of windings so that the voltage across the secondary winding of the regulator is zero when the regulator is in a predetermined bucking position, a series transformer having its primary winding connected to the terminals of said regulator and its secondary winding connected in series with the circuit to be regulated, and switching means adapted to reverse the connections of the primary winding of said transformer to said regulator.

6. In a voltage regulating system for an alternating current circuit, the combination of an induction regulator having its inducing and induced windings connected together as an auto-transformer and provided with the proper number of windings so that the voltage across the secondary winding of the regulator is zero when the regulator is in a predetermined bucking position, a series transformer having its primary winding connected to the terminals of said regulator and its secondary winding connected in series with the circuit to be regulated, and switching means adapted to short circuit the primary winding of said series transformer and to reverse the connections thereof to said regulator.

7. In a voltage regulating system for an alternating current circuit, the combination of an induction regulator having its inducing and induced windings connected together as an auto-transformer and substantially the same number of turns in both windings, a potential transformer connected between said inducing winding and the circuit to be regulated, a series transformer having its primary winding connected to the terminals of said regulator and its secondary winding connected in series with the circuit to be regulated, and switching means adapted to reverse the connections of the primary winding of said transformer to said regulator.

8. The method of varying the voltage of an alternating current circuit by means of an induction regulator which has substantially the same number of turns in its inducing and induced windings and said windings connected as an auto-transformer, and a series transformer which has its primary winding connected to the terminals of said auto-transformer and its secondary winding connected in series with the circuit to be regulated, which consists in changing the voltage by means of the regulator until the voltage impressed by the auto-transformer across the primary winding of the series transformer equals zero, then reversing the connections of the primary winding of the series transformer to the terminals of the auto-transformer, and again changing the voltage by means of the regulator.

9. The method of varying the voltage of an alternating current circuit by means of an induction regulator which has substantially the same number of turns in its inducing and induced windings and said windings connected as an auto-transformer, and a series transformer which has its primary winding connected to the terminals of said auto-transformer and its secondary winding connected in series with the circuit to be regulated, which consists in changing the voltage by means of the regulator until the voltage impressed by the auto-transformer across the primary winding of the series transformer equals zero, then short circuiting the primary winding of the series transformer, then reversing the connections of the primary winding of the series transformer to the terminals of the auto-transformer, then opening the short circuit across the terminals of the series transformer and again changing the voltage by means of the regulator.

10. The method of varying the voltage of an alternating current circuit by means of an induction regulator having its inducing and induced windings connected together as an auto-transformer and provided with the proper number of turns so that the voltage across the secondary windings of the regulator is zero when the regulator is in a predetermined bucking position, and a series transformer which has its primary winding connected to the terminals of said auto-transformer and its secondary winding connected in series with the circuit to be regulated, which consists in changing the voltage by means of the regulator until the voltage impressed across the primary winding of the series transformer by the auto-transformer equals zero, then reversing the connections of the primary winding of the series transformer to the terminals of the auto-transformer, and again changing the voltage by means of the regulator.

11. The method of varying the voltage of an alternating current circuit by means of an induction regulator having its inducing and induced windings connected together as an auto-transformer and provided with the proper number of turns so that the voltage across the secondary windings of the regulator is zero when the regulator is in a predetermined bucking position, and a series transformer which has its primary winding connected to the terminals of said auto-transformer and its secondary winding connected in series with the circuit to be regulated, which consists in changing the voltage by means of the regulator until the voltage impressed by the auto-transformer across the primary winding of the series transformer equals zero, then short circuiting the primary winding of the series transformer, then reversing the connections of the primary winding of the series transformer to the terminals of the auto-transformer, then opening the short circuit across the terminals of the series transformer and again changing the voltage by means of the regulator.

12. In a voltage regulating system for an alternating current circuit, the combination of an induction regulator having its inducing and induced windings connected together as an auto-transformer and substantially the same number of turns in both windings, a series transformer interposed between the secondary terminals of said regulator and the circuit to be regulated, and switching means arranged to be operated to reverse the connections of one of the windings of said series transformer.

13. In a voltage regulating system for an alternating current circuit, the combination of an induction regulator having its inducing and induced windings connected together as an auto-transformer and provided with the proper number of turns so that the voltage across the secondary winding of the transformer is zero when the regulator is in a predetermined bucking position, a series transformer having its primary winding connected to the terminals of said regulator and its secondary winding connected in series with the circuit to be regulated, and switching means adapted to be operated to reverse the connections of one of the windings of said transformer.

14. The method of varying the voltage of an alternating current circuit by means of an induction regulator having its inducing and induced windings connected together as an auto-transformer and provided with the proper number of turns, so that the voltage across the secondary winding of the regulator is zero when the regulator is in a predetermined bucking position, and a series transformer which has its primary winding connected to the terminals of said auto-transformer and its secondary winding connected in series with the circuit to be regulated, which consists in changing the voltage by means of the regulator until the voltage impressed by the auto transformer across the primary winding of the series transformer equals zero, then reversing the connections of one of the windings of the series transformer and changing the voltage by means of the regulator.

In witness whereof, I have hereunto set my hand this sixteenth day of March, 1921.

FRANKLIN J. CHAMPLIN.